(12) United States Patent
Maeda et al.

(10) Patent No.: US 7,724,736 B2
(45) Date of Patent: May 25, 2010

(54) FRAME FORWARDING APPARATUS

(75) Inventors: Yoshiyuki Maeda, Fukuoka (JP);
Hironori Kadota, Fukuoka (JP); Yoko Toyozumi, Fukuoka (JP); Yumiko Ogata, Fukuoka (JP); Yoshiko Sakamoto, Fukuoka (JP); Seiji Miyata, Fukuoka (JP); Hiromu Yoshi, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 426 days.

(21) Appl. No.: 11/905,357

(22) Filed: Sep. 28, 2007

(65) Prior Publication Data
US 2008/0031271 A1 Feb. 7, 2008

Related U.S. Application Data

(63) Continuation of application No. PCT/JP2005/006353, filed on Mar. 31, 2005.

(51) Int. Cl.
*H04L 12/28* (2006.01)
(52) U.S. Cl. ........................ 370/389; 370/401
(58) Field of Classification Search ............ 370/254, 370/255, 389, 392, 400, 401
See application file for complete search history.

(56) References Cited

U.S. PATENT DOCUMENTS

| | | | |
|---|---|---|---|
| 6,151,324 A * | 11/2000 | Belser et al. | 370/397 |
| 6,266,705 B1 | 7/2001 | Ullum et al. | |
| 6,449,279 B1 * | 9/2002 | Belser et al. | 370/397 |
| 6,515,993 B1 * | 2/2003 | Williams et al. | 370/395.53 |
| 6,633,567 B1 * | 10/2003 | Brown | 370/395.3 |
| 7,292,569 B1 * | 11/2007 | Smith et al. | 370/383 |
| 7,385,973 B1 * | 6/2008 | Johnson et al. | 370/389 |
| 7,558,273 B1 * | 7/2009 | Grosser et al. | 370/395.53 |
| 2003/0152075 A1 * | 8/2003 | Hawthorne et al. | 370/389 |
| 2004/0032868 A1 * | 2/2004 | Oda et al. | 370/389 |

FOREIGN PATENT DOCUMENTS

| | | |
|---|---|---|
| JP | 11-004224 | 1/1999 |
| WO | WO 02/ 19638 | 3/2002 |
| WO | WO 2004/023732 | 3/2004 |

\* cited by examiner

*Primary Examiner*—Hong Cho
(74) *Attorney, Agent, or Firm*—Staas & Halsey LLP

(57) ABSTRACT

A frame forwarding apparatus comprises a receiving unit receiving a frame including a source address, a destination address and a VWAN identifier; a converting unit converting a VWAN identifier in the frame into one of degenerate VWAN identifiers that the number of adoptable values thereof is smaller than the number of VWAN identifiers; a storage unit containing at least one entry containing the source address in the frame, a degenerate VWAN identifier that a VWAN identifier in the frame is converted, and path information representing a path via which the frame is received; a retrieving unit retrieving, from said storage unit, an entry corresponding to the destination address in the frame and the degenerate VWAN identifier in the frame; a restoring unit restoring the degenerate VWAN identifier in the frame into the original VWAN identifier; and a transmitting unit transmitting the frame based on the path information in the entry retrieved.

12 Claims, 17 Drawing Sheets

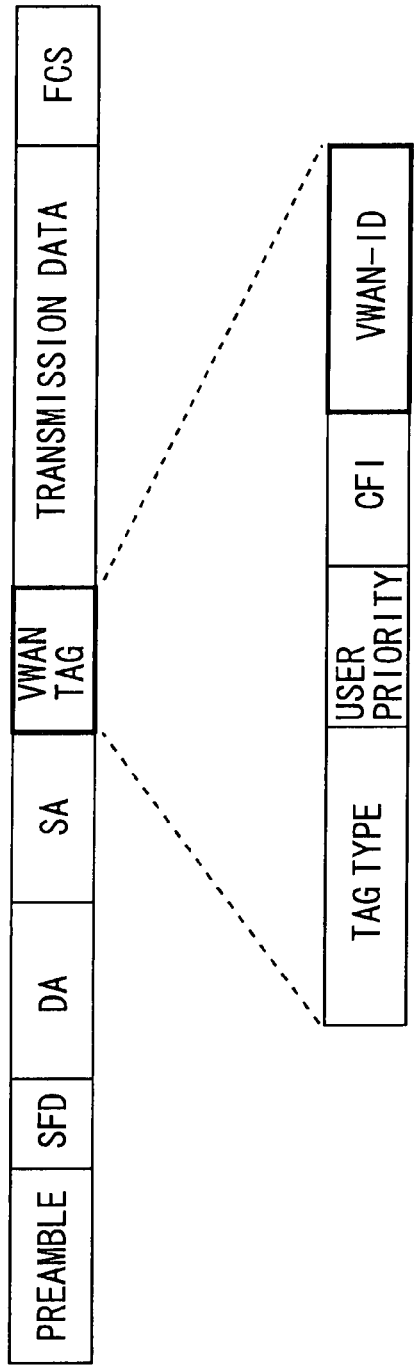

FIG. 1 PRIOR ART

PREAMBLE: SYNCHRONOUS PATTERN OF BIT SYNCHRONIZATION
SFD: START FRAME DELIMITER INDICATING HEAD OF VALID FRAME
DA: DESTINATION ADDRESS
SA: SOURCE ADDRESS
FCS: FRAME CHECK SEQUENCE BEING GENERATOR POLYNOMIAL FOR ERROR DETECTION
TAG TYPE: IDENTIFIER SPECIFYING TAG-ATTACHED FRAME
USER PRIORITY: IDENTIFIER REPRESENTING PRIORITY/NON-PRIORITY FOR FRAME
CFI: CANONICIAL FORMAT INDICATOR
      BEING FLAG INDICATING WHETHER SOURCE ROUTING INFORMATION EXISTS OR NOT.
VWAN-ID: IDENTIFIER UNIQUELY SPECIFYING VWAN GROUP TO WHICH FRAME BELONGS.
      SPECIFIC VALUES INVOLVE USING SUCH AS VWAN ID= 0 TO 4095.
      VWAN IDs = 0, 1, AND 4095 ARE ALREADY-RESERVED IDs.

FIG. 7

| | No. | MANAGEMENT QUEUE |
|---|---|---|
| HEAD NUMBER OF MANAGEMENT QUEUE = 0;<br>TAIL END NUMBER OF MANAGEMENT QUEUE = 63;<br>THE NUMBER OF REGISTERED DEGENERATE VWAN-ID = 0; | 0 | 1 |
| | 1 | 2 |
| | 2 | 3 |
| | ⋮ | ⋮ |
| | 62 | 63 |
| | 63 | 64 |

| No. | MANAGEMENT QUEUE |
|---|---|
| 0 | 1 |
| 1 | 2 |
| 2 | 3 |
| .. | .. |
| 62 | 63 |
| 63 | 64 |

16

HEAD NUMBER OF
MANAGEMENT QUEUE = 0;
TAIL END NUMBER OF
MANAGEMENT QUEUE = 63;
THE NUMBER OF REGISTERED
DEGENERATE VWAN-ID = 0;

11A

| REGISTERED/ UNREGISTERED STATUS | VWAN-ID | DEGENERATE VWAN-ID |
|---|---|---|
| 0 | 0 | 1 |
| 0 | 0 | 2 |
| 0 | 0 | 3 |
| .. | .. | .. |
| 0 | 0 | 63 |
| 0 | 0 | 64 |

| No. | MANAGEMENT QUEUE | REGISTERED/ UNREGISTERED STATUS | VWAN-ID | DEGENERATE VWAN-ID |
|---|---|---|---|---|
| 0 | ffffffff | 1 | 100 | 1 |
| 1 | 2 | 0 | 0 | 2 |
| 2 | 3 | 0 | 0 | 3 |
| .. | .. | .. | .. | .. |
| 62 | 63 | 0 | 0 | 63 |
| 63 | 64 | 0 | 0 | 64 |

| | |
|---|---|
| HEAD NUMBER OF MANAGEMENT QUEUE = | 1; |
| TAIL END NUMBER OF MANAGEMENT QUEUE = | 63; |
| THE NUMBER OF REGISTERED DEGENERATE VWAN-ID = | 1; |

FIG. 12C

| No. | MANAGEMENT QUEUE | REGISTERED/ UNREGISTERED STATUS | VWAN-ID | DEGENERATE VWAN-ID |
|---|---|---|---|---|
| 0 | ffffffff | 1 | 100 | 1 |
| 1 | ffffffff | 1 | 200 | 2 |
| 2 | 3 | 0 | 0 | 3 |
| ... | ... | ... | ... | ... |
| 62 | 63 | 0 | 0 | 63 |
| 63 | 64 | 0 | 0 | 64 |

HEAD NUMBER OF MANAGEMENT QUEUE = <u>2</u>;
TAIL END NUMBER OF MANAGEMENT QUEUE = 63;
THE NUMBER OF REGISTERED DEGENERATE VWAN-ID = <u>2</u>;

FIG. 12D

| | | 11A | | | |
|---|---|---|---|---|---|
| | No. | MANAGEMENT QUEUE | REGISTERED/ UNREGISTERED STATUS | VWAN-ID | DEGENERATE VWAN-ID |
| | 0 | 2 | 1 | 100 | 1 |
| | 1 | ffffffff | 0 | 0 | 2 |
| | 2 | 3 | 0 | 0 | 3 |
| | ... | ... | ... | ... | ... |
| | 62 | 63 | 0 | 0 | 63 |
| | 63 | 64 | 0 | 0 | 64 |

HEAD NUMBER OF MANAGEMENT QUEUE = 2;
TAIL END NUMBER OF MANAGEMENT QUEUE = 0;
THE NUMBER OF REGISTERED DEGENERATE VWAN-ID = 1;

(16 — MANAGEMENT QUEUE column; 15 — DEGENERATE VWAN-ID column)

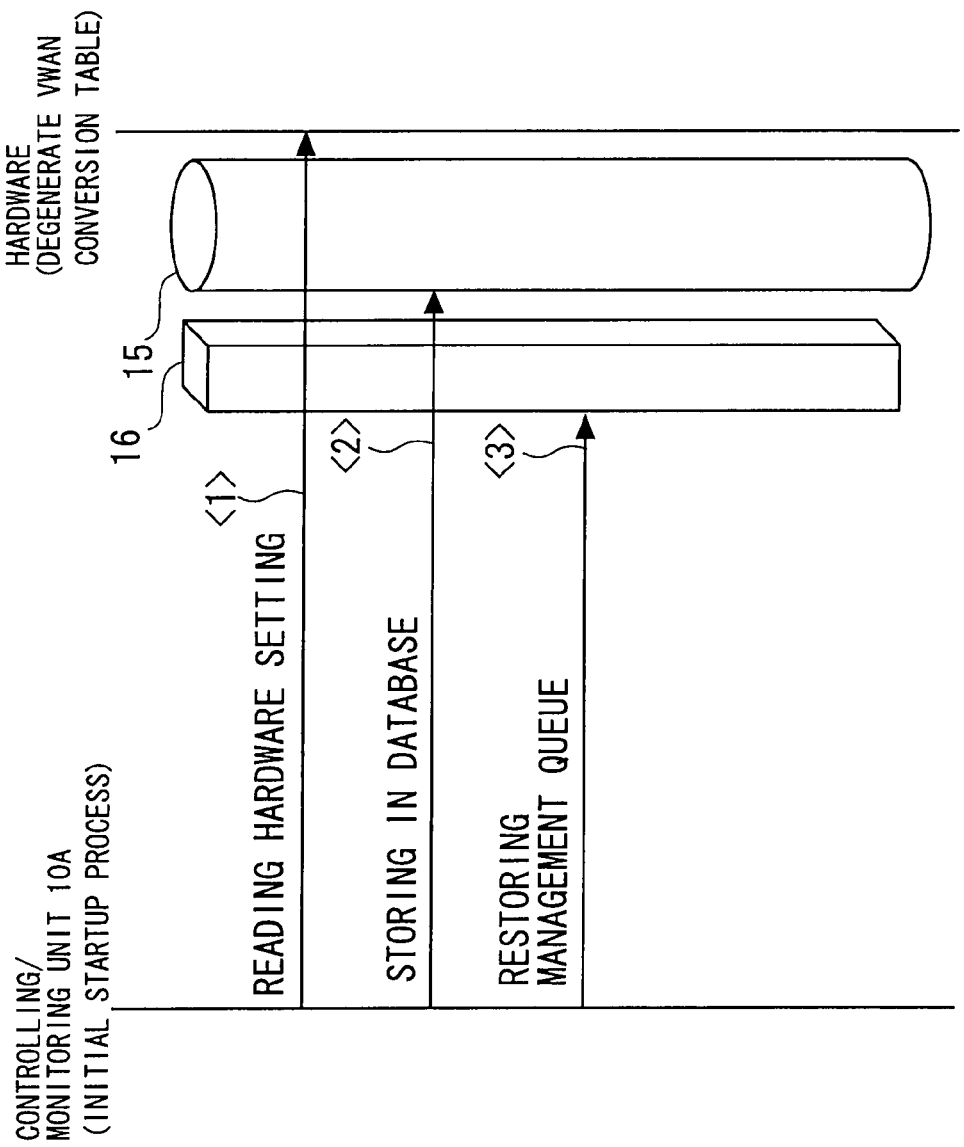

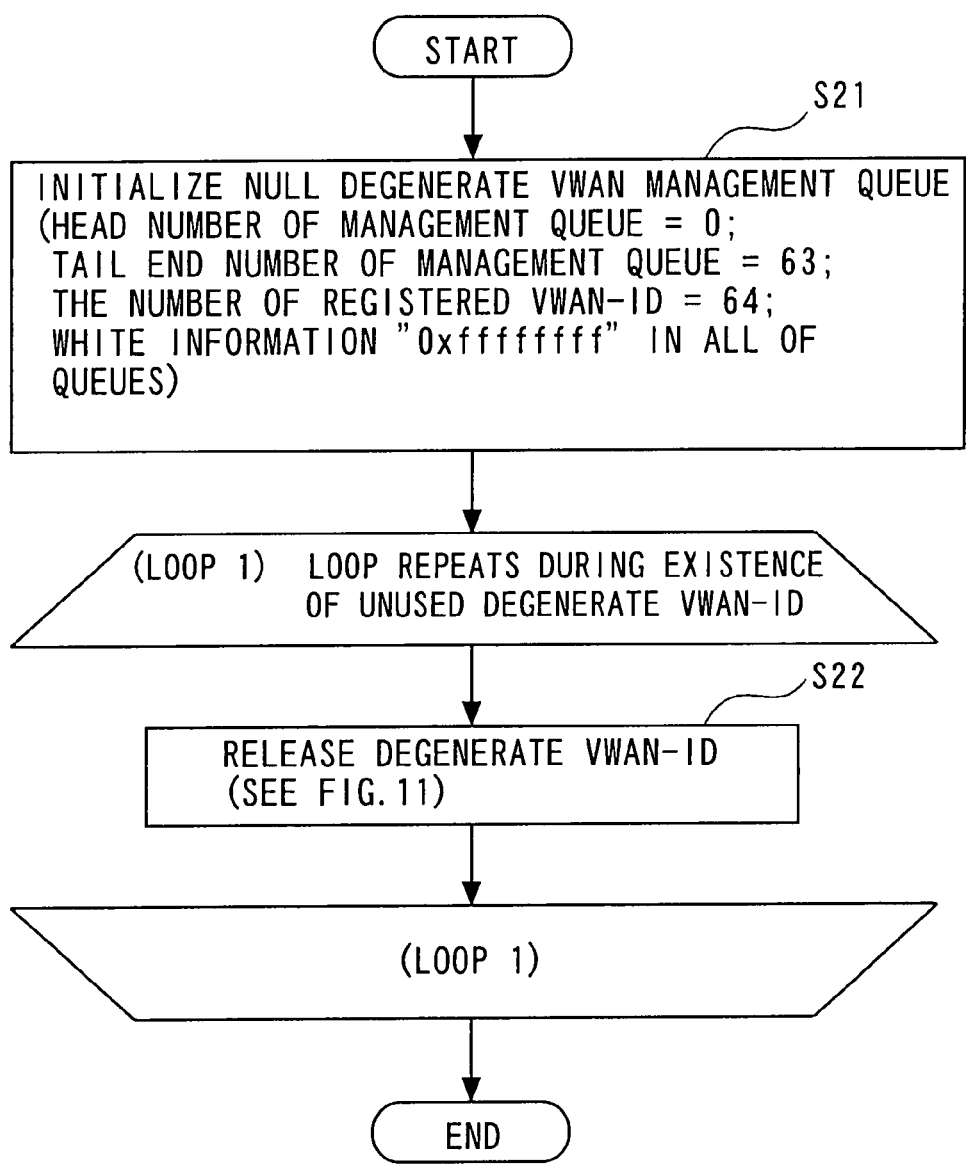

US 7,724,736 B2

FRAME FORWARDING APPARATUS

CROSS-REFERENCE TO RELATED APPLICATION

This is a continuation of Application PCT/JP2005/006353, filed on Mar. 31, 2005, now pending, the contents of which are herein wholly incorporated by reference.

BACKGROUND

The present invention relates to a VWAN (Virtual Wide Area Networks, a synonym of VLAN (virtual Local Area Networks) standardized by IEEE802.1Q [Virtual Bridged Local Area Networks], and other synonyms are VPN (Virtual Private networks), VMAN (Virtual Metro Area networks)) management system of an apparatus installed within a network, which employs a layer-2 switch (L2SW) etc.

In the field related to the VWAN, PoweredCom, Inc. adopted a system such as "Ethernet (registered trademark) over Ethernet (registered trade mark) (EoE)", and other companies announced systems for reducing a load of a switch on a large quantity of traffic.

According to the EoE, an ingress edge switch (edge SW) attaches MAC (Media Access Control) addresses of an egress edge switch and of the ingress edge switch itself and a VWAN tag to a frame entering the ingress edge switch itself, and sends this frame to within a core network. The frame attached with the MAC addresses and the VWAN tag is forwarded to within the core network. An advantage of the EoE is that the load on the core switch forwarding the frame across the core network may be reduced.

FIG. 1 is an explanatory diagram of a frame format pursuant to the IEEE802.3. As shown in FIG. 1, the frame has a field for storing the VWAN tag. The VWAN tag has fields, and one of the fields is used to store a VWAN-ID (VLAN-ID). The VWAN-ID is an identifier uniquely representing a VWAN group to which the frame belongs, and involves using any one of values "0" through "4095" as specific values.

FIG. 2 illustrates an example of a system including the wide area Ethernet (registered trademark) network by way of an example of the network system utilizing the VWAN. Respective customer edge domains (customer-sided networks) 1 and 2 are connected to the wide area Ethernet (registered trademark) network 3 (which will hereinafter be simply referred to as the network 3) via edge switches 4 each including a switching function.

Individual end users within the customer edge domains 1 and 2 have VWAN-IDs (X, Y, Z) for dividing the frames of the individual customers within the network 3, wherein the frames are transferred and received only between the end users having the same VWAN-ID.

For instance, an assumption is that the customer (the end user) having the VWAN-ID=X in the customer edge domain 1 transmits a frame to the end user having the same VWAN-ID=X in the customer edge domain 2.

In this case, when the frame is received by the edge switch 4 (an ingress edge switch) on the side of the customer edge domain 1, the frame is attached with MAC addresses of the ingress and egress edge switches 4 and with the VWAN-ID=X and is thus sent to within the network 3.

The frame is forwarded to between the core switches (core SWs) in the network 3 and reaches the egress edge switch 4. At the egress edge switch 4, the MAC addresses and the VWAN-ID=X attached to the frame are removed, and this frame is sent to the corresponding end user (VWAN-ID=X) in the customer edge domain 2.

FIG. 3 is a diagram showing a configuration of an apparatus included in a layer-2 switch (applicable to an edge switch and a core switch) in the conventional system. FIG. 3 illustrates that the layer-2 switch includes a receiving line interface unit 6 that receives input traffic (frames) from a facing (opposed) apparatus, a transmitting line interface unit 7 that transmits traffic (frames) to the facing apparatus, a layer-2 switch (L2SW) engine 8 that switches the traffic on the layer-2, a memory 11 containing control information of the L2SW engine 8, and a controlling/monitoring unit 10 that is connected to a terminal 5 for an operation of a maintenance operator (which will hereinafter be simply referred to as the terminal 5) via a user interface unit 9 and monitors the information stored in the memory 11.

FIG. 4 is an explanatory diagram of a learning/retrieving method in the L2SW using the MAC learning table included in the L2SW engine 8. In FIG. 4, when the receiving line interface unit (receiving I/F) 6 receives a frame and a source MAC address in the frame, a port number of a port which was used to receive the frame, and a VWAN-ID in the frame, are stored in the MAC learning table.

Thereafter, if a frame is received from a different port, the MAC learning table is retrieved by use of, as retrieving keys, a destination MAC address (MAC-DA) and the VWAN-ID which are contained in the received frame. At this time, the frame is forwarded to a port (path) that is hit as a result of the retrieving.

In the conventional systems illustrated in FIGS. 3 and 4, the VWAN-ID of the customer-sided network 1 is learned at the edge switch 4 as shown in FIG. 2. It is therefore required that VWAN-IDs corresponding to a learning count (the number of times of learning) and frame receiving ports be managed within the edge switch SW 4. Accordingly, an entry registerable count of the entries (the number of registerable entries) to be contained in the MAC learning table is given such as "the number of MAC Addresses X the number of VWAN-IDs X the number of input (Receiving) ports (symbols "X" are multiplication symbols)".

Such scheme is required to provide a memory for the MAC learning table having a tremendous quantity of capacity. On the other hand, management of the entries given by "the number of VWAN-IDs X the number of input ports" is required to be conducted. Hence, an output port retrieving process gets complicated, resulting in a possibility that performance of the L2SW is to be deteriorated.

Patent document 1 shown below is given as a document of the prior art related to the present application.

Patent document 1: Japanese Patent Application Laid-Open Publication No. Hei11(1999)-4224

SUMMARY

An object is to provide a technology which is able to decrease a storage capacity of a storage containing information for determining a frame outgoing path.

Further, another object is to provide a technology which is able to reduce at least a load on a retrieving process by use of a storage unit.

The following configurations may be adopted, in order to accomplish the objects given above.

A first aspect is a frame forwarding apparatus comprising:
 a receiving unit receiving a frame including a source address, a destination address and a VWAN (Virtual Wide Area Network) identifier;
 a converting unit converting a VWAN identifier in the frame into one of degenerate VWAN identifiers that the number of adoptable values thereof is smaller than the number of VWAN identifiers;

a storage unit containing at least one entry containing the source address in the frame, the degenerate VWAN identifier that a VWAN identifier in the frame is converted and path information representing a path via which the frame is received;

a retrieving unit retrieving, from the storage, an entry corresponding to the destination address in the frame and the degenerate VWAN identifier in the frame;

a restoring unit restoring the degenerate VWAN identifier in the frame into the original VWAN identifier; and a transmitting unit transmitting the frame based on the path information in the entry retrieved.

According to the present invention, the storage unit contains the degenerate VWAN identifier instead of the VWAN identifier. The number of adoptable values of the degenerate VWAN identifiers is smaller than the number of adoptable values of VWAN identifiers. It is therefore feasible to restrain the registerable number of the entries that should be contained in the storage unit. This scheme enables reduction in the storage capacity required of the storage unit. Further, the decrease in the number of entries can lead to improvement of the retrieving process by the retrieving unit.

Preferably, the frame forwarding apparatus according to the first aspect further comprises:

a degenerate VWAN identifier storage unit containing a plurality of degenerate VWAN identifiers;

a determining unit determining, in response to a VWAN identifier registration request, one of unused degenerate VWAN identifiers stored in the degenerate VWAN identifier storage unit as a degenerate VWAN identifier corresponding to the VWAN identifier related to the registration request; and a setting unit setting the determined degenerate VWAN identifier as a degenerate VWAN identifier used for the conversion by the converting unit.

With this configuration, when the VWAN identifier is registered in the frame forwarding apparatus, the degenerate VWAN identifier associated with the VWAN identifier can be set in the converting unit.

Preferably, the frame forwarding apparatus according to the present invention further comprises:

a using status storage unit containing a using status of each of the degenerate VWAN identifiers; and a using status management unit storing a set of the determined degenerate VWAN identifier and the VWAN identifier corresponding to the determined degenerate VWAN identifier in the using status storage unit.

With this configuration, the using status of the degenerate VWAN identifier can be checked by referring to storage contents of the using status storage unit.

Preferably, the frame forwarding apparatus according to the first aspect further comprises a deleting unit deleting, in response to a deleting request of a VWAN identifier, an entry containing a degenerate VWAN identifier corresponding to the VWAN identifier relating to the deleting request from the storage unit, wherein the setting unit cancels the setting of the degenerate VWAN identifier to the converting unit.

With this scheme, when the VWAN identifier is deleted from the frame forwarding apparatus, the entry related to the deletion is deleted from the storage unit, and the setting in the converting unit and in the restoring unit is canceled, whereby a malfunction of the frame forwarding apparatus can be prevented.

Preferably, the frame forwarding apparatus according to the first aspect further comprises a degenerate VWAN identifier management unit storing, when the determining unit determines the degenerate VWAN identifier, information representing an in-use status of the determined degenerate VWAN identifier in the degenerate VWAN identifier storage unit, and storing, when the setting unit cancels the setting of the degenerate VWAN identifier in the converting unit, information representing an unused status of the degenerate VWAN identifier relating to the cancellation of the setting in the degenerate VWAN identifier storage unit.

With this contrivance, the using status of the respective degenerate VWAN identifiers can be managed in the degenerate VWAN identifier storage unit.

Preferably, in the frame forwarding apparatus according to the first aspect, the using status management unit deletes, when canceling the setting of the degenerate VWAN identifier to the converting unit, the pair of the degenerate VWAN identifier and the VWAN identifier from the using status storage unit.

With this scheme, the using status of the degenerate VWAN identifier can be accurately managed.

Preferably, in the frame forwarding apparatus according to the first aspect, the degenerate VWAN identifier management unit stores, when resetting the information representing an in-use status or an unused status of each degenerate VWAN identifier in the degenerate VWAN identifier storage unit, information representing the in-use status or the unused status of each degenerate VWAN identifier in the degenerate VWAN identifier storage unit based on the setting of the degenerate VWAN identifier to the converting unit.

With this contrivance, even when the degenerate VWAN identifier storage unit is reset, the using status of the degenerate VWAN identifier can be restored on the VWAN identifier storage unit from the actual contents of the setting in the converting unit and the restoring unit.

Further, a second aspect is a control apparatus of a frame forwarding apparatus including: a receiving unit receiving a frame including a source address, a destination address and a VWAN (Virtual Wide Area Network) identifier; a converting unit converting a VWAN identifier in the frame into one of degenerate VWAN identifiers that the number of adoptable values thereof is smaller than the number of VWAN identifiers; a storage unit containing at least one entry containing the source address in the frame, a degenerate VWAN identifier that a VWAN identifier in the frame is converted, and path information representing a path via which the frame is received; a retrieving unit retrieving, from the storage unit, an entry corresponding to the destination address in the frame and the degenerate VWAN identifier in the frame; a restoring unit restoring the degenerate VWAN identifier in the frame into the original VWAN identifier; and a transmitting unit transmitting the frame based on the path information in the entry retrieved, the control apparatus comprising:

a degenerate VWAN identifier storage unit containing a plurality of degenerate VWAN identifiers;

a determining unit determining, in response to a VWAN identifier registration request, one of unused degenerate VWAN identifiers stored in the degenerate VWAN identifier storage unit as a degenerate VWAN identifier corresponding to the VWAN identifier related to the registration request; and a setting unit setting the determined degenerate VWAN identifier as a degenerate VWAN identifier used for the conversion by the converting unit.

Moreover, as one or more other aspects, it may be adopted at least one of a frame forwarding control method by the frame forwarding apparatus described above, a control method (management method) of the frame forwarding apparatus, a program for realizing these methods, and a recording medium stored with the program.

According to one of the aspects, it is possible to reduce a storage capacity of a storage storing information for determining a frame outgoing path.

Further, according to one of the aspects, it is possible to decrease at least load on retrieving process using a storage.

BRIEF DESCRIPTION OF THE DRAWINGS

FIG. 1 is an explanatory diagram of a frame format based on IEEE802.3.

FIG. 7 is a diagram showing an example of a data structure of a null degenerate VWAN management queue.

FIG. 12A is a diagram showing the degenerate VWAN database and the null degenerate VWAN management queue in an initial status (when not yet registered) (1).

FIG. 12B is a diagram showing the degenerate VWAN database and the null degenerate VWAN management queue when registering "VWAN-ID=100" (2).

FIG. 12C is a diagram showing the degenerate VWAN database and the null degenerate VWAN management queue when registering "VWAN-ID=200" after the process (2) shown in FIG. 12B (3).

FIG. 12D is a diagram showing the degenerate VWAN database and the null degenerate VWAN management queue when deleting "VWAN-ID=200" after the process (3) shown in FIG. 12C (4).

FIG. 13 is a sequence diagram showing an example of a degenerate VWAN restoring (restoring) process.

FIG. 14 is a flowchart showing an example of a restoring (restoring) process in a null degenerate VWAN management queue.

DESCRIPTION OF THE REFERENCE NUMERALS AND SYMBOLS

Figure 2:
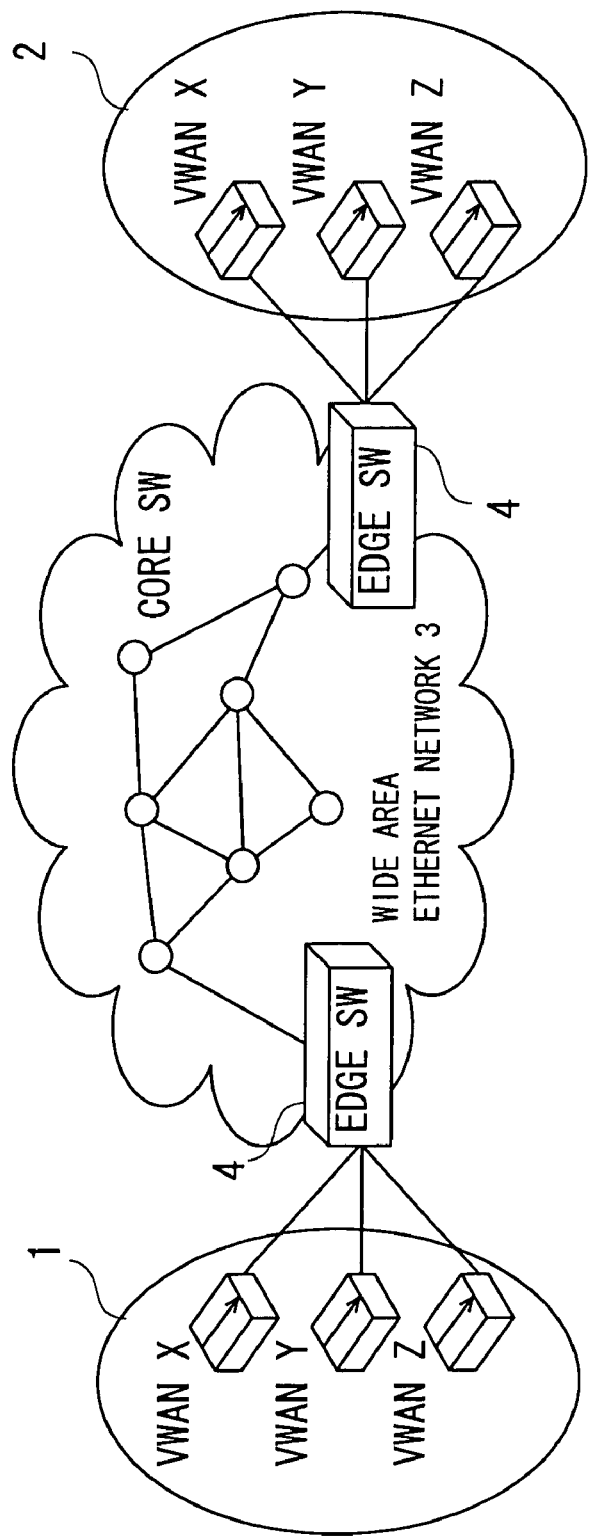
FIG. 2 is a diagram showing an example of a network system utilizing the wide area Ethernet (registered trademark) at the present.
Figure 3:
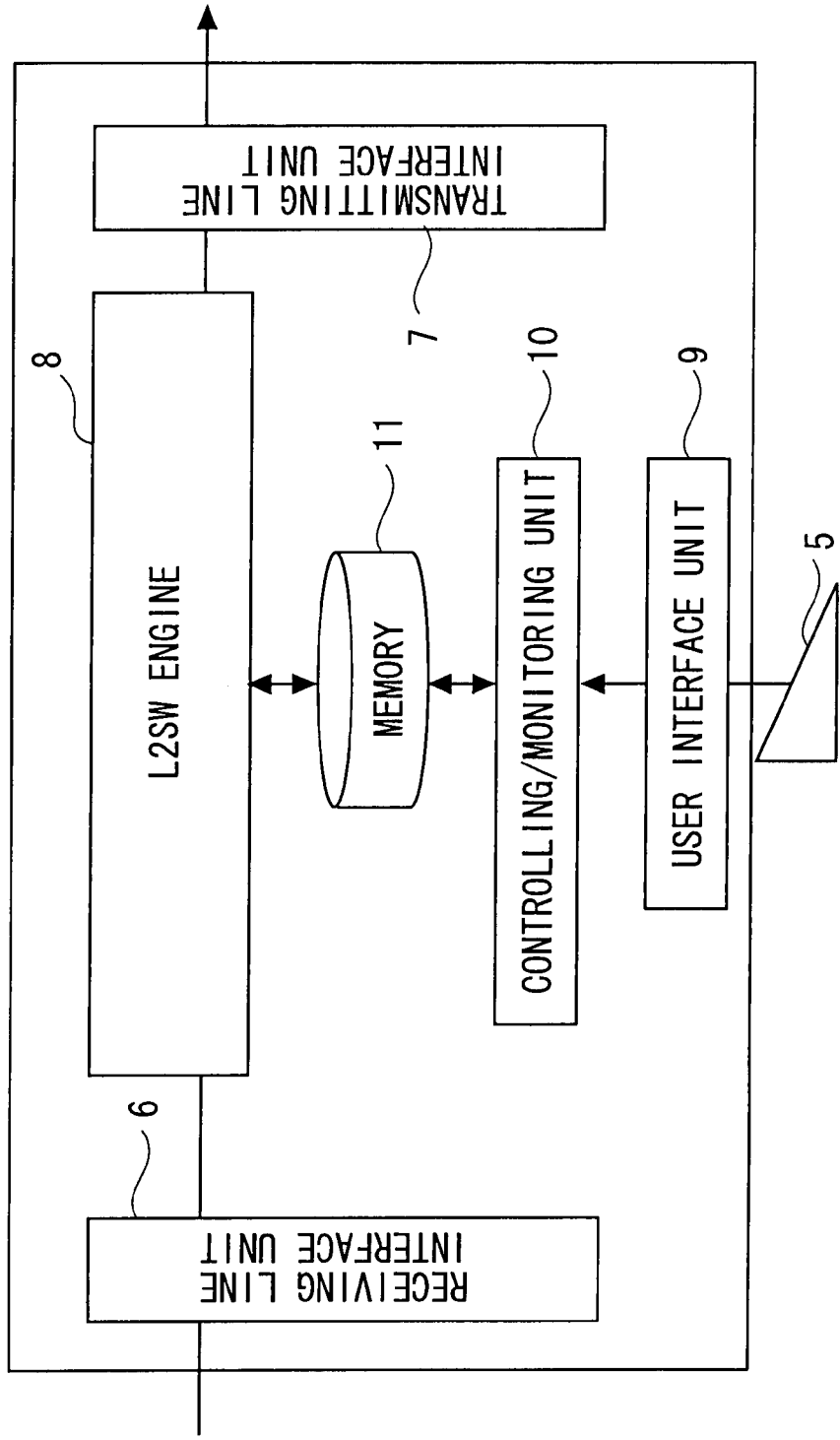
FIG. 3 is a diagram illustrating an apparatus configuration of a layer-2 switch in the prior art.

5 . . . terminal for operation of maintenance operator
6 . . . receiving line interface unit
7 . . . transmitting line interface unit
8A . . . L2SW engine
9 . . . user interface unit
10A . . . controlling/monitoring unit
11A . . . memory
12 . . . degenerate VWAN converting unit
13 . . . degenerate VWAN restoring unit
14 . . . MAC learning table
15 . . . degenerate VWAN database
16 . . . null degenerate VWAN management queue
17 . . . entry deleting unit
50 . . . layer-2 switch

DETAILED DESCRIPTION OF THE EMBODIMENT

An embodiment will hereinafter be described with reference to the drawings. A configuration in the following embodiment is an exemplification, and the aspect is not limited to the configuration in the embodiment.

Outline of Embodiment

In an embodiment, intra-VWAN-IDs (Virtual Wide Area Network identifier) used within a layer-2 switch (L2SW) are defined. The intra-VWAN-ID is called "degenerate VWAN (Virtual Wide Area Network)". A VWAN-ID in a frame is converted into a degenerate VWAN-ID, and processes within the apparatus are executed with the degenerate VWAN-ID.

<Configuration of Layer-2 Switch>

Figure 5:
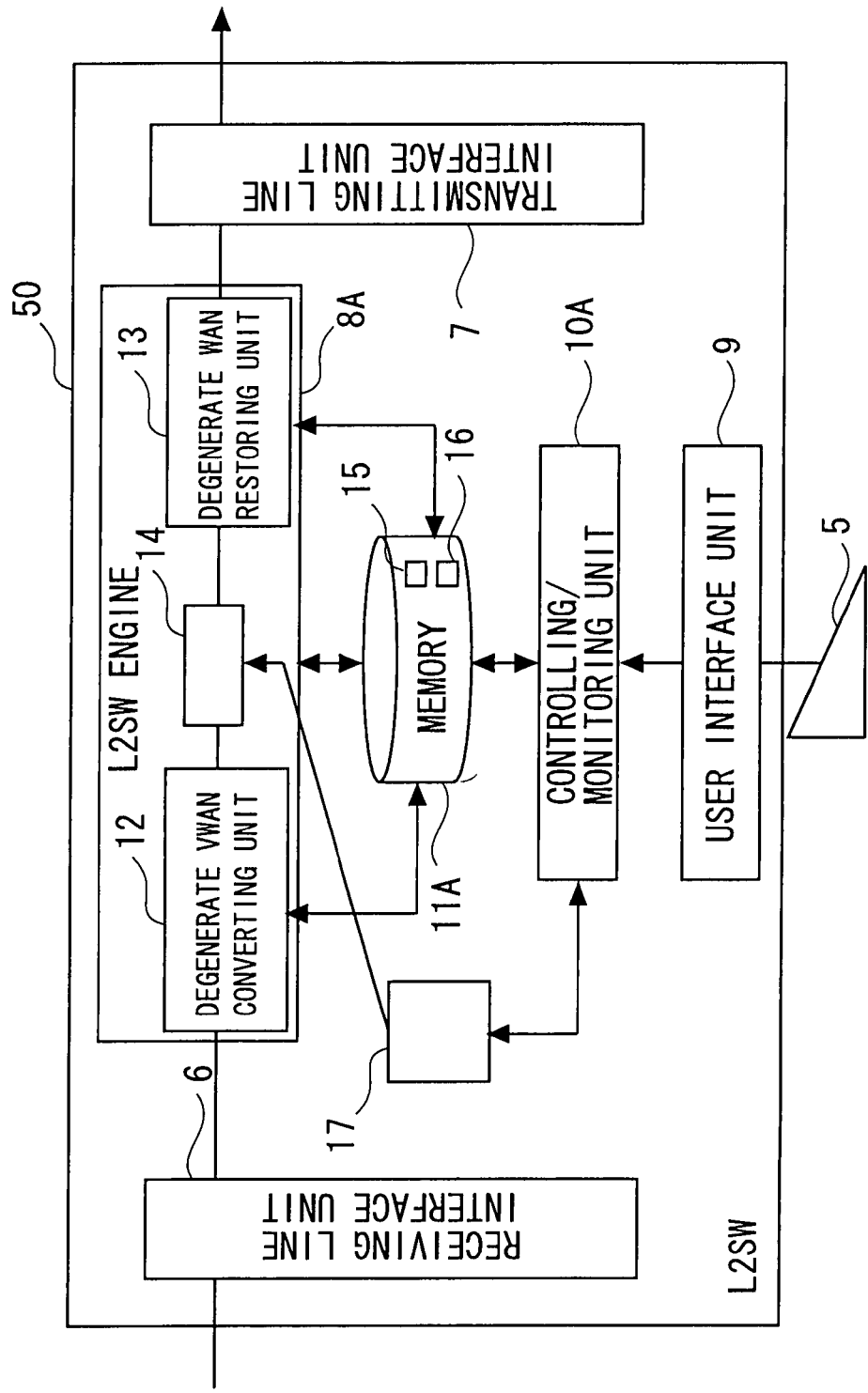
FIG. 5 is a diagram illustrating an apparatus configuration of a layer-2 switch according to an embodiment of the present invention.

FIG. 5 is a diagram illustrating a frame forwarding apparatus (layer-2 switch) according to the embodiment. The layer-2 switch (L2SW) 50 illustrated in FIG. 5 may be applied to, e.g., an edge switch and a core switch in a wide area Ethernet (registered trademark) network.

FIG. 5 shows that the L2SW 50 includes a receiving line interface unit 6 receiving input traffic (frames) from an apparatus (e.g., an adjoining L2SW) in a face-to-face (facing) relationship, a transmitting line interface unit 7 transmitting traffic (frames) to a facing apparatus such as an adjoining L2SW, an L2SW engine 8A that switches traffic on the layer 2 by use of a MAC (Media Access Control) learning table 14, a memory (storage) 11A containing control information of the L2SW engine 8A, and a controlling/monitoring unit 10A (control unit) connected via a user interface unit 9 to a terminal 5 for an operation of a maintenance operator and monitoring the information stored in the memory 11A.

The terminal 5 is used for controlling and monitoring the apparatus (L2SW). The user interface unit 9 interfaces operations of the terminal 5 with the L2SW 50. and the user interface unit 9 also outputs information within the L2SW 50 to the terminal 5. The controlling/monitoring unit 10A monitors all items of information within the L2SW. The memory 11A has a function of storing information for controlling the L2SW engine 8A in accordance with an operation given from the controlling/monitoring unit 10A, and a function of storing information on the L2SW engine 8A at the present.

The configuration of the L2SW employed in the conventional system may be applied to the configuration described above. In the L2SW 50 according to the present embodiment, a degenerate VWAN converting unit 12 and a degenerate VWAN restoring unit 13 are added to the L2SW engine 8A with the MAC learning table 14.

The degenerate VWAN converting unit 12 converts a VWAN-ID contained in a frame inputted from the receiving line interface unit 6 to the L2SW engine 8A into a degenerate VWAN-ID used only within the L2SW 50.

The degenerate VWAN restoring unit 13 restores a degenerate VWAN-ID contained in the frame to be output to the transmitting line interface unit 7 into an original VWAN-ID.

The degenerate VWAN-ID converted by the degenerate VWAN converting unit 12 is used upon registering an entry in the MAC learning table 14 and retrieving the entry from this table 14. The number of the degenerate VWAN-IDs (which will hereinafter be termed a degenerate VWAN-ID count) is smaller than the number of original VWAN-IDs (an original VWAN-ID count).

Figure 4:
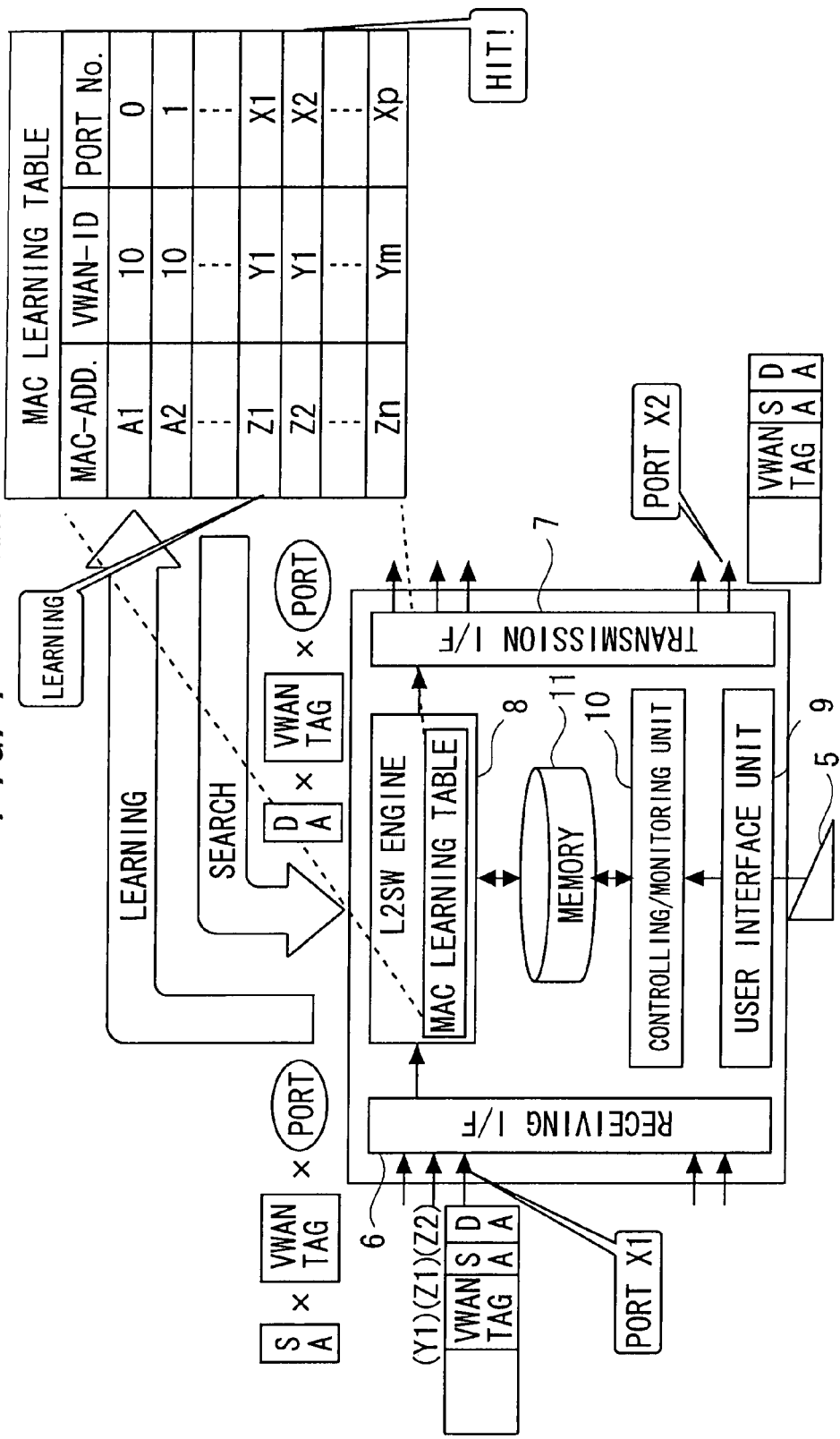
FIG. 4 is an explanatory diagram of a conventional learning method using a MAC learning table.

The MAC learning table 14 has the same data structure as the MAC learning table shown in FIG. 4 has. The MAC learning table 14 in the present embodiment contains, however, the degenerate VWAN-ID instead of the VWAN-ID. Namely, the MAC learning table 14 is registered with entries each containing a MAC address (MAC-SA), a degenerate VWAN-ID and an input port number. Further, the MAC learning table 14 is used in a way that retrieves for, as an output port number, a port number contained in an entry corresponding to the MAC-DA and the degenerate VWAN-ID contained in the frame.

Further, in order to manage the degenerate VWAN-IDs within the L2SW 50, the memory 11A contains a degenerate VWAN database 15 for managing a status of use of each degenerate VWAN-ID and a null degenerate VWAN management queue 16 for managing a degenerate VWAN-ID having a null status (unused state) that should be next allocated to a VWAN-ID.

Figure 6:
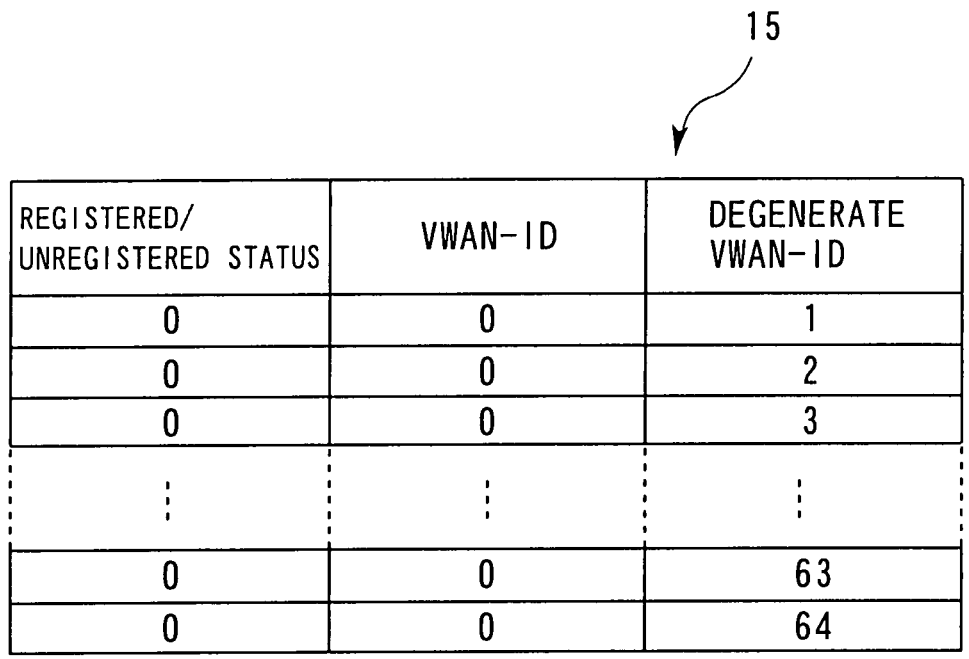
FIG. 6 is a diagram showing an example of a data structure of a degenerate VWAN database.

FIG. 6 is a diagram showing an example of a data structure of the degenerate VWAN database 15. In FIG. 6, the degenerate VWAN database 15 has a table structure composed of a plurality of entries. Each of the entries has fields for storing a flag showing a registered/unregistered status (1 or 0) of the VWAN-ID, a registered VWAN-ID and a degenerate VWAN-ID associated with (allocated to) the registered VWAN-ID.

The present embodiment exemplifies an instance of preparing 64 pieces of degenerate VWAN-IDs ("1"-"64") for 4096 pieces of VWAN-IDs. An arbitrary number of degenerate VWAN-IDs less than the original VWAN-ID count may be determined as the degenerate VWAN-ID count.

The VWAN-ID is able to take each of 4096 pieces of values, according to one bit or a plurality of bits representing the VWAN-ID. On the other hand, the VWAN-ID count actually used in the network is smaller than the logical number of values that can be used as the VWAN-ID. Accordingly, the degenerate VWAN-ID count presumed to be used in the network is prepared.

If the degenerate VWAN-ID count is well smaller than the VWAN-ID count (e.g., 64 pieces of degenerate VWAN-IDs are given for 4096 pieces of VWAN-IDs), the degenerate VWAN-IDs are expressed with the number of bits smaller than the number of bits for representing the VWAN-ID. Such a decrease in the number of bits enables reducing a memory capacity and simplifying processing in the L2SW.

FIG. 7 is a diagram showing an example of a data structure of the null degenerate VWAN management queue 16. FIG. 7 shows that the null degenerate VWAN management queue 16 has a queue table organized by 64 queues, each queue having a degenerate VWAN-ID. In this example, the queue table contains the degenerate VWAN-IDs "1" to "64". Further, the null degenerate VWAN management queue 16 contains "a head number of the management queue", "a tail end number of management queue" and "the number of registered degenerate VWAN-IDs". Each of the sixty four queues has one of queue numbers "0" to "63". The head number of the management queue is a pointer indicating a beginning point of the queue table, and the tail end number of the management queue is a pointer indicating an ending point of the queue table. The number of the registered degenerate VWAN-IDs indicates the number of degenerate VWAN-IDs registered in the table 14 and the database 15.

The controlling/monitoring unit 10A changes contents stored in the degenerate VWAN database 15 (which will hereinafter be referred to simply as the "database 15") and in the null degenerate VWAN management queue 16 (which will hereinafter be referred to simply as the "management queue 16"). The controlling/monitoring unit 10A changes the storage contents based on information (instructions etc.) given from the terminal 5, which information is inputted via the user interface unit 9.

The degenerate VWAN-IDs managed in the database 15 and the management queue 16 are set in the degenerate VWAN converting unit 12 and in the degenerate VWAN restoring unit 13 as the necessity may arise.

The L2SW engine 8A (the degenerate VWAN converting unit 12, the degenerate VWAN restoring unit 13) is constructed by use of, e.g., a dedicated hardware chip. The MAC learning table 14 is generated on a memory or storage.

On the other hand, the controlling/monitoring unit 10A is a defined as a function actualized in the way that a processor (for example, a CPU) mounted in the L2SW 50 executes a program (software) stored in an unillustrated storage apparatus.

Thus, the degenerate VWAN management algorithm is included in the software and is realized as the controlling/monitoring unit 10A, thereby a retrieving process of an entry is simplified and performance of the L2SW is improved.

The receiving line interface unit 6 corresponds to a receiving unit, and the transmitting line interface unit 7 corresponds to a transmitting unit. Further, the degenerate VWAN converting unit 12 corresponds to a converting unit, and the degenerate VWAN restoring unit 13 corresponds to a restoring unit.

Moreover, the controlling/monitoring unit 10A functions as a determining unit, a setting unit, a degenerate VWAN identifier management unit and a using status management unit. Still further, the memory 11A corresponds to a degenerate VWAN identifier storage unit and a using status management unit. Yet further, the memory (storage) containing the MAC learning table 14 corresponds to a storage unit. Moreover, an entry deleting unit 17 corresponds to a deleting unit.

Further, the controlling/monitoring unit 10A, the memory 11A and the entry deleting unit 17 correspond to a control apparatus of a frame forwarding apparatus. Configurations related to the control apparatus may also be provided outside the frame forwarding apparatus.

<Operation of L2SW 50>

The L2SW 50 having the configuration described above performs the following operation for a received frame. The frame received by the receiving line interface unit 6 is inputted to the L2SW engine 8A.

In the L2SW engine 8A, the degenerate VWAN converting unit 12 converts a VWAN-ID contained in the frame into a degenerate VWAN-ID. Thereafter, the L2SW engine 8A executes a registering process of an entry using the MAC learning table 14 (if the MAC address and the degenerate VWAN-ID are not yet registered) and a process of retrieving an entry (an output port).

A frame that an output port is determined is inputted to the degenerate VWAN restoring unit 13 before being sent to the transmitting line interface unit 7. The degenerate VWAN restoring unit 13 converts (restores) the degenerate VWAN-ID in the frame into the original VWAN-ID, and thereafter transfers the frame to the transmitting line interface unit 7. The transmitting line interface unit 7 sends (outputs) the frame from the output port retrieved (determined) by the L2SW engine 8A.

In the operation described above, the MAC learning table 14 used by the L2SW engine 8A is managed by employing the degenerate VWAN-ID. In other words, the MAC learning table 14 is registered with the degenerate VWAN-ID instead of the VWAN-ID.

Therefore, the registerable number of the entries that should be included in the MAC learning table 14 is given by "the number of MAC Addresses X the number of degenerate VWAN-IDs X the number of input ports (the symbols "X" is multiplication symbols)". This scheme reduces a storage capacity of a memory constituting the MAC learning table 14. For instance, if the number of the VWAN-IDs decreases down from "4096" to "64", the storage capacity of the memory may be reduced to a great degree.

Further, the number of entries managed by the MAC learning table 14 is decreased such as "the number of the VWAN-IDs X the number of the input port (the symbol "X" is multiplication symbols)". This scheme may reduce a load of the retrieving process through the MAC learning table 14. Such a decrease in the processing load may contribute to improve the performance of the whole L2SW 50.

[Management of Degenerate VWAN]

Next, the management of the degenerate VWAN-IDs (the registration, the deletion and the decompression of the degenerate VWAN-IDs) in the L2SW 50 will be explained.

<Process when Making Degenerate VWAN Registration>

Given next is an explanation of a processing sequence when making the degenerate VWAN-ID registration using the degenerate VWAN database 15 and the null degenerate VWAN management queue 16.

Upon registering the degenerate VWAN-ID corresponding to a certain VWAN-ID, a maintenance operator of the L2SW 50 inputs an instruction of "VWAN registration" to the controlling/monitoring unit 10A by operating the terminal 5.

Figure 8:
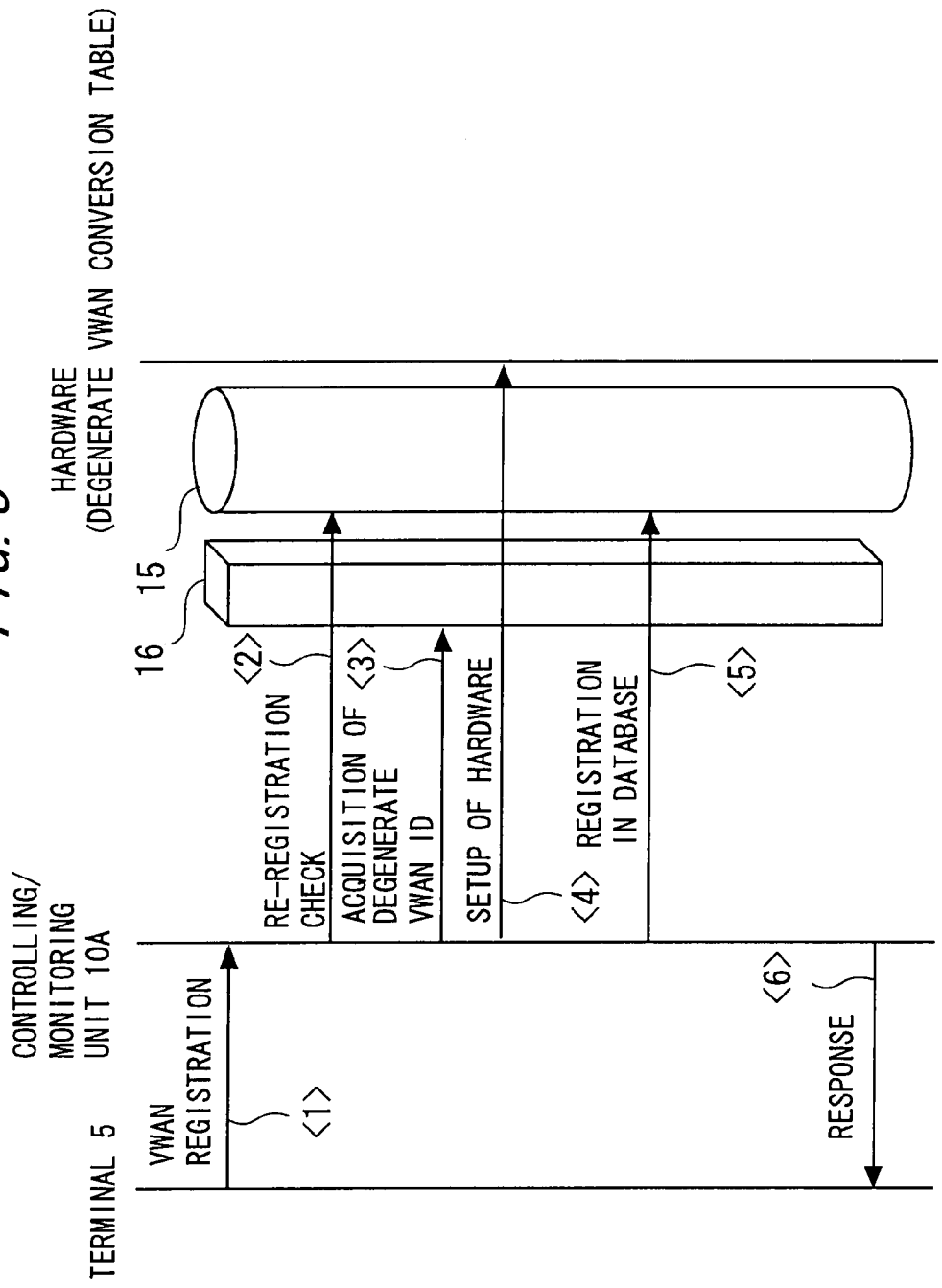
FIG. 8 is a sequence diagram showing an example of a degenerate VWAN registering process.

FIG. 8 is a sequence diagram showing a degenerate VWAN registering process. In FIG. 8, to begin with, the controlling/monitoring unit 10A of the L2SW 50 receives the instruction of the "VWAN registration" from the terminal 5 (FIG. 8 <1>).

The controlling/monitoring unit 10A refers to the degenerate VWAN database 15 and thus determines whether or not a VWAN-ID to be registered has already been registered in the degenerate VWAN database 15 (re-registration check) (FIG. 8 <2>).

The controlling/monitoring unit 10A, as a result of the re-registration check, if the VWAN-ID to be registered is not yet registered in the degenerate VWAN database 15 (which will hereinafter be referred to simply as the "database 15"), acquires a degenerate VWAN-ID to be registered from the null degenerate VWAN management queue 16 (which will hereinafter be referred to simply as the "management queue 16") (FIG. 8 <3>).

Figure 9:
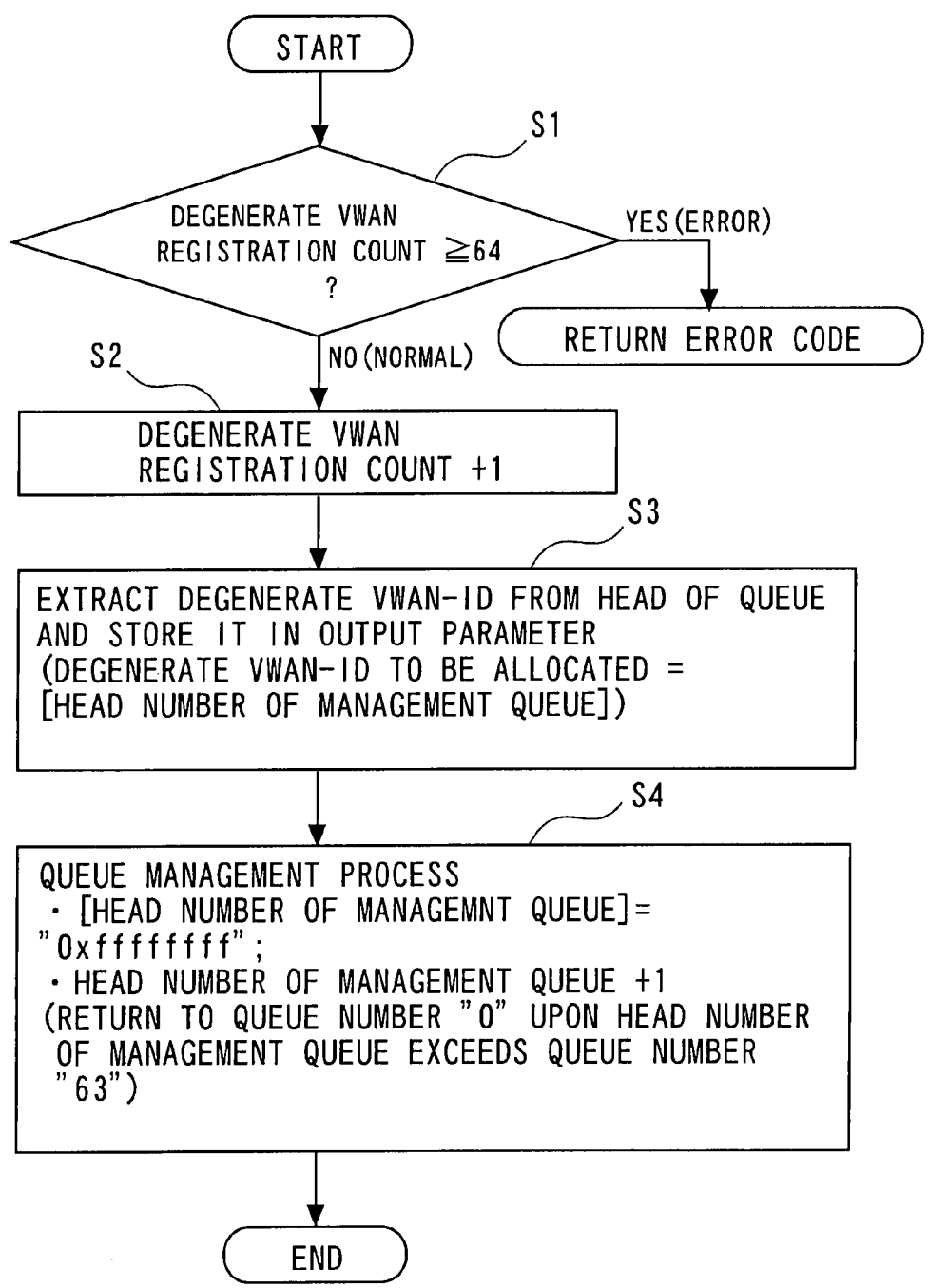
FIG. 9 is a flowchart showing an example of a degenerate VWAN acquiring process.

FIG. 9 is a flowchart showing an acquiring processing of the degenerate VWAN-ID by the controlling/monitoring unit 10A. In FIG. 9, at first, the controlling/monitoring unit 10A checks a value of "degenerate VWAN registration count (namely, the number of the registered degenerate VWAN-IDs)" stored in the management queue 16 (FIG. 7) (step S1).

At this time, if the degenerate VWAN registration count is equal to or larger than 64 (S1; YES (error)), the controlling/monitoring unit 10A deems it to be an error and terminates the processing. Whereas if the degenerate VWAN registration count is smaller than 64 (S1; NO (normal)), the controlling/monitoring unit 10A advances the processing to step S2.

In step S2, the controlling/monitoring unit 10A increments the value of the "degenerate VWAN registration count" stored in the management queue 16 by "1".

Subsequently, the controlling/monitoring unit 10A extracts (reads), from a beginning point of the management queue 16, a degenerate VWAN-ID that should be allocated to the VWAN-ID to be registered, and stores the degenerate VWAN-ID extracted in an output parameter.

At this time, the beginning point of the management queue 16 is specified based on the "head number of the management queue" stored in the management queue 16. A degenerate VWAN-ID stored in a management queue having a queue number corresponding to the head number of the management queue is acquired. Thus, the degenerate VWAN-ID stored in a current beginning point of the management queue 16 is read.

Next, a queue management process is executed. To be specific, the controlling/monitoring unit 10A stores information of "0xffffffff" representing an in-use status in the management queue corresponding to the head number of the management queues (the current beginning point of the management queue 16). The management queue containing the degenerate VWAN-ID used for the registration is thereby set in the null status (the in-use status) (the null degenerate VWAN queue table [the null degenerate VWAN queue head number]=0xffffffff).

Further, the controlling/monitoring unit 10A adds "1" to the null degenerate VWAN queue head number (the head number of the management queues). At this time, if the head number of the management queue exceeds the last queue number, namely the queue number "63", the head number of the management queue returns to the queue number "0".

Through the process described above, the controlling/monitoring unit 10A acquires, as an output parameter, the degenerate VWAN-ID assigned to the VWAN-ID to be registered.

Referring back to FIG. 8, the controlling/monitoring unit 10A sets the acquired degenerate VWAN-ID in the hardware (the degenerate VWAN conversion table) via the memory 11A (FIG. 8 <4>).

The L2SW engine 8A has, on a memory, a degenerate VWAN conversion table (not shown in FIG. 5) used by the degenerate VWAN converting unit 12 and by the degenerate VWAN restoring unit 13.

The degenerate VWAN conversion table retains an associative relation between the VWAN-ID and the degenerate VWAN-ID, and is used when the degenerate VWAN converting unit 12 converts the VWAN-ID in the frame into the degenerate VWAN-ID and when the degenerate VWAN restoring unit 13 restores the degenerate VWAN-ID into the original VWAN-ID.

An available scheme is, it is to be noted, that each of the degenerate VWAN converting unit 12 and the degenerate VWAN restoring unit 13 has a dedicated degenerate VWAN conversion (conversion) table.

Subsequently, the controlling/monitoring unit 10A registers the VWAN-ID to be registered and the acquired degenerate VWAN-ID in the database 15 (FIG. 6) (FIG. 8 <5>).

Upon finishing the registration in the database 15, the controlling/monitoring unit 10A gives the terminal 5 a response indicating completion of the registering process (FIG. 8 <6>).

As the apparatus configuration and the registration processing flow described above are thus applied, the degenerate VWAN-ID is registered and managed in the L2SW 50. Thus, the degenerate VWAN-IDs is efficiently used by the degenerate VWAN converting unit 12 and the degenerate VWAN restoring unit 13 in the L2SW engine 8A.

<Process when Making Degenerate VWAN Deletion>

Figure 10:
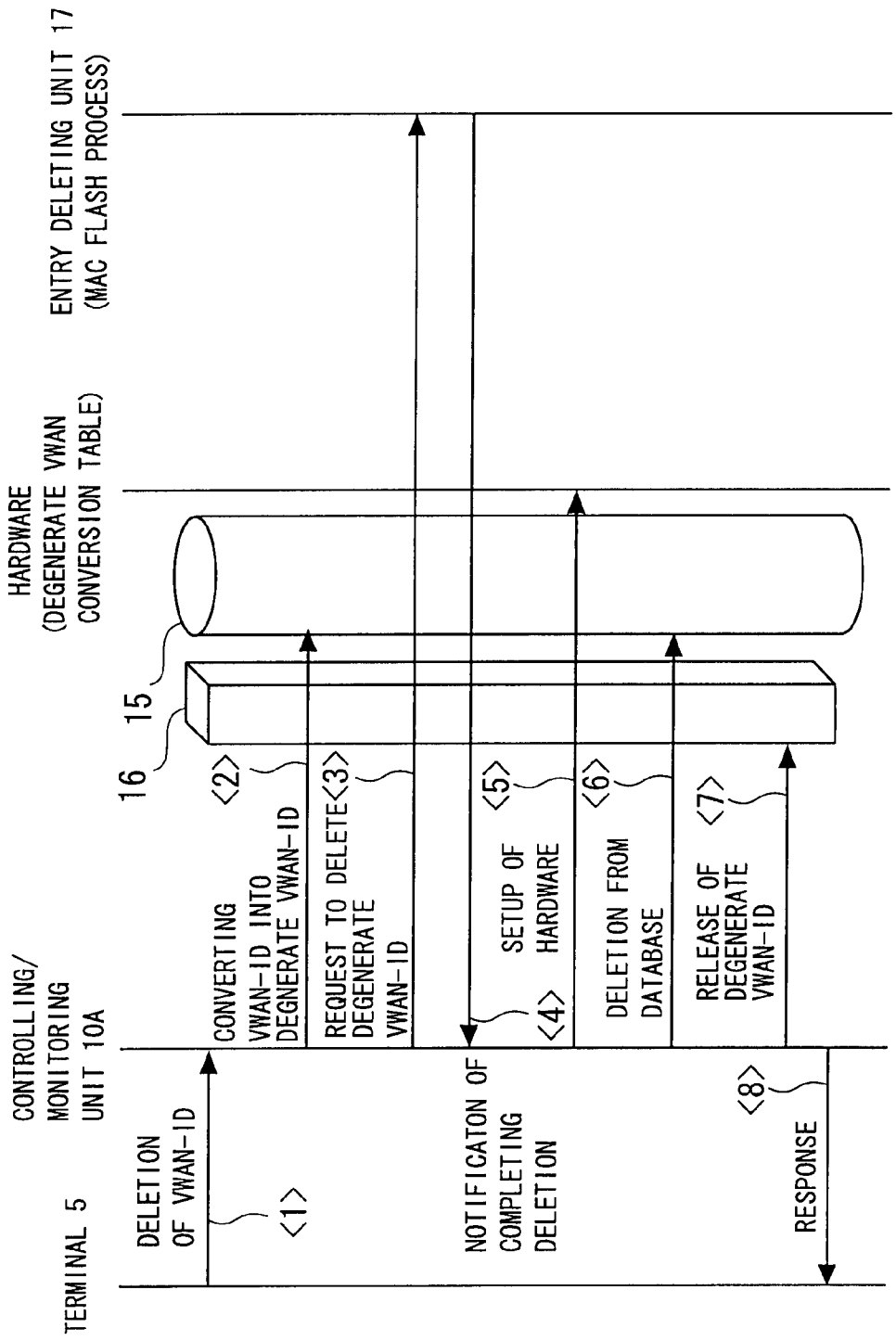
FIG. 10 is a sequence diagram showing an example of a degenerate VWAN deleting process.
Figure 11:
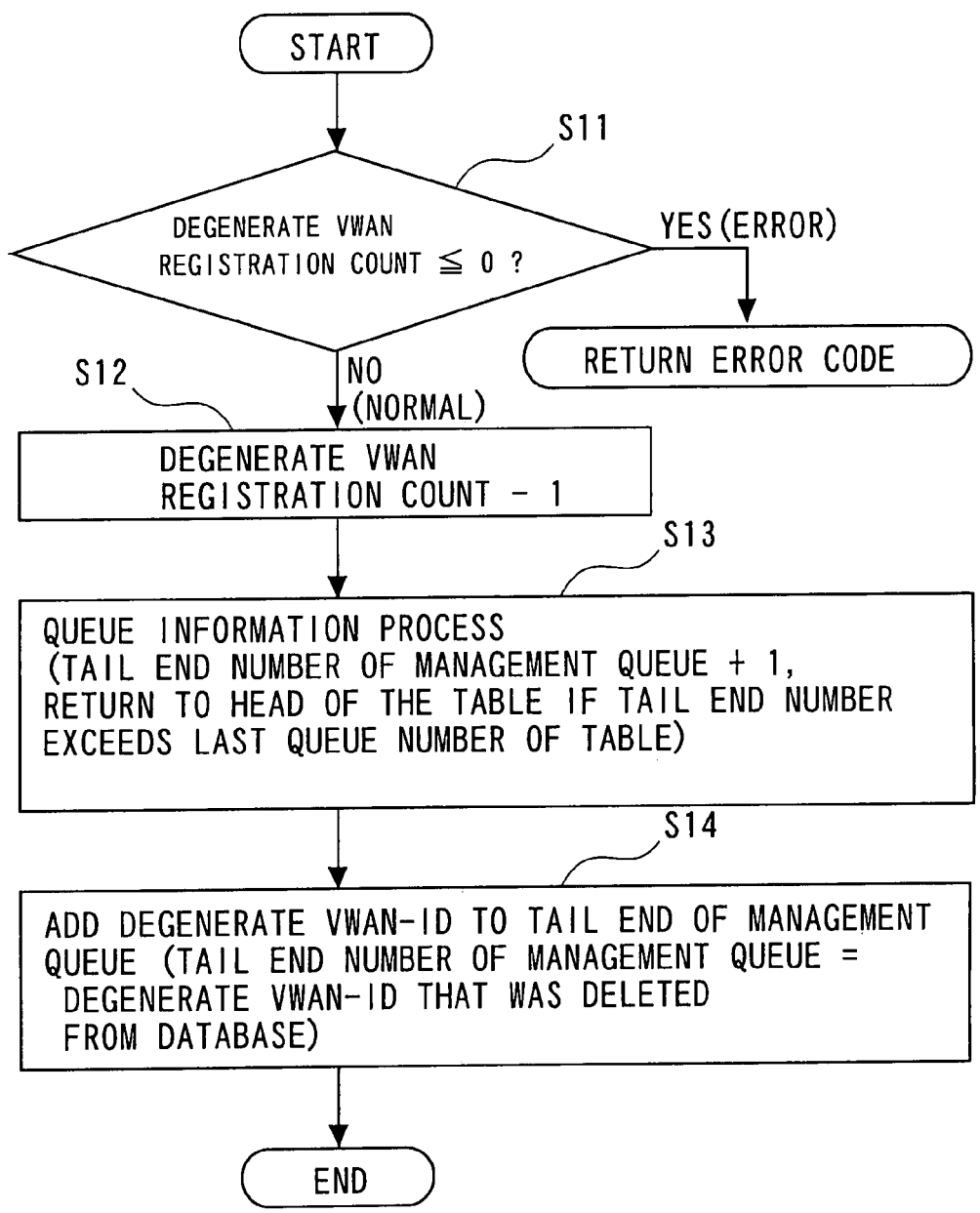
FIG. 11 is a flowchart showing an example of a degenerate VWAN releasing process.

Next, a processing sequence when deleting the degenerate VWAN-ID by use of the database 15 and the management queue 16, will be explained. FIG. 10 is a sequence diagram showing a degenerate VWAN deleting process. FIG. 11 is a flowchart showing a degenerate VWAN releasing process (FIG. 10 <7>).

In FIG. 10, to start with, an instruction "VWAN deletion" from the terminal 5 is inputted to the controlling/monitoring unit 10A (FIG. 10 <1>).

Then, the controlling/monitoring unit 10A refers to the database 15 and converts the VWAN-ID to be deleted, which is included in the instruction "VWAN deletion", into a corresponding degenerate VWAN-ID (FIG. 10 <2>).

Next, the controlling/monitoring unit 10A makes a delete request by use of the degenerate VWAN-ID (FIG. 10 <3>). Herein, the L2SW 50 includes an entry deleting unit (MAC flash process) 17 having a function for deleting an entry of the MAC learning table 14 that contains the degenerate VWAN-ID to be deleted (see FIG. 5).

Note that the entry deleting unit 17 constitutes a part of the L2SW engine 8A or may be realized by use of a hardware component independent of the L2SW engine 8A. Further, the entry deleting unit 17 may be realized as a function actualized by software.

The controlling/monitoring unit 10A transfers the degenerate VWAN-ID to the entry deleting unit 17 and requests the entry deleting unit 17 to delete the entry containing this degenerate VWAN-ID.

The entry deleting unit 17 deletes, in response to the request, the entry containing the degenerate VWAN-ID to be deleted from the MAC learning table 14 in the L2SW engine 8A. Upon completing the deletion, the entry deleting unit 17 notifies the controlling/monitoring unit 10A of a completion of the deletion (FIG. 10 <4>).

When receiving the notification of the completion of the deletion, the controlling/monitoring unit 10A deletes the entry containing the degenerate VWAN-ID relating to the deletion from the degenerate VWAN conversion table in the L2SW engine 8A (FIG. 10 <5>: setup of the hardware).

Subsequently, the controlling/monitoring unit 10A accesses the database 15 on the memory 11A and executes a process of deleting the registration of the degenerate VWAN-ID relating the deletion (a process of updating the database) (FIG. 10 <6>: deletion from the database).

Next, the controlling/monitoring unit 10A accesses the management queue 16 on the memory 11A and executes a process of releasing the degenerate VWAN-ID (FIG. 10 <7>: release of degenerate VWAN-ID).

As illustrated in FIG. 11, the controlling/monitoring unit 10A checks a value of the "degenerate VWAN registration count (the number of the registered degenerate VWAN-IDs)" stored in the management queue 16 (step 11).

At this time, if the "degenerate VWAN registration count" is equal to or smaller than "0" (S11; YES (error)), this is deemed to be an error, and the processing comes to an end. Whereas if the "degenerate VWAN registration count" exceeds "0" (S11; NO (normal)), the processing proceeds to step S12.

In step S12, the controlling/monitoring unit 10A decrements the value of the "degenerate VWAN registration count" stored in the management queue 16 by "1".

Subsequently, a queue management process is executed (step S13). Namely, the controlling/monitoring unit 10A increments a value of the "null degenerate VWAN queue tail number (the tail end number of the management queue)" in the management queue 16 by "1". At this time, if the value of the "null degenerate VWAN queue tail number" exceeds the last queue number "63" stored in the table, a first unused queue number stored in the head of the table is set as the tail end number of the management queue.

Then, the controlling/monitoring unit 10A adds the degenerate VWAN-ID, which is deleted from the database 15, to the tail end of the management queue. Namely, the controlling/monitoring unit 10A stores the degenerate VWAN-ID in a queue having the "null degenerate VWAN queue tail number (the tail end number of the management queue)" in the management queue 16.

Referring back to FIG. 10, when finishing the degenerate VWAN-ID releasing process, the controlling/monitoring unit 10A notifies the terminal 5 that the deleting process has been finished (FIG. 10 <8>).

The application of the configuration and of the delete processing flow described above enables the deletion of the FDB (Forwarding Database) information (i.e., the entry in the MAC learning table 14) learned with the degenerate VWAN-ID used in the past.

This scheme can prevent the L2SW engine 8 from running with the erroneous FDB information. Accordingly, the degenerate VWAN-ID can be efficiently employed.

Specific Examples

FIG. 12 is a diagram showing specific examples of registering and deleting the degenerate VWAN-ID. FIG. 12A is a diagram illustrating the database 15 and the management queue 16 in an initial status (when not yet registered) (1). FIG. 12B is a diagram showing the database 15 and the management queue 16 when the maintenance operator registers the VWAN-ID=100 (2). FIG. 12C is a diagram illustrating the database 15 and the management queue 16 when the maintenance operator further registers the VWAN-ID=200 (3). FIG. 12D is a diagram illustrating the database 15 and the management queue 16 when the maintenance operator deletes the registration of the VWAN-ID=200 after executing the process (3) (4).

As shown in FIG. 12A, in the initial status, the degenerate VWAN-IDs "1" through "64" are stored in the table of the management queue 16 sequentially from the head of the table. Further, in the initial status, the management queue 16 is stored with the head number of the management queue=0, the tail end number of the management queue=63 and the number of registered degenerate VWAN-ID=0.

As shown in FIG. 12B, upon registering the VWAN-ID=100, the degenerate VWAN-ID=1 is extracted from the table of the management queue 16, corresponding to the head number of the management queue=0. Along with this process, the value of the queue is rewritten into the information "0xffffffff" representing the in-use status. Further, a value of "1" is added to the head number of the management queue with the result that the head number=1, and the number of the registered degenerate VWAN-ID is updated such as the number of the registered degenerate VWAN-ID=1. Herein, no change occurs in the tail end number of the management queue.

On the other hand, in the database 15, a value of "1" representing the registered status is set in a flag of a head of an entry storage area, and an associative relation between the VWAN-ID=100 and the degenerate VWAN-ID=1 is stored.

Thereafter, in the case of registering the VWAN-ID=200, as shown in FIG. 12C, the degenerate VWAN-ID=2, which is stored in the queue with the queue number "2", is extracted corresponding to the head number of the management queue=1. Along with this process, the head number is changed to a value of "2", and the number of the registered degenerate VWAN-ID is changed to a value of "2".

On the other hand, in the database 15, the associative relation between the VWAN-ID=200 and the degenerate VWAN-ID=2 is registered, and the flag representing the registered status is set.

Thereafter, in the case of deleting the VWAN-ID=200, as illustrated in FIG. 12D, the entry containing the associative relation between the VWAN-ID=200 and the degenerate VWAN-ID=2 is deleted from the database 15, and a value of "0" representing the unregistered status is set in the flag of this entry.

While on the other hand, in the management queue 16, the number of the registered degenerate VWAN-ID is changed into a value of "1" by decrementing by one. Moreover, the first queue indicating the in-use status is specified from the head of the table, and the deleted VWAN-ID is stored in this specified queue. Herein, the queue with the queue number "0" corresponds to the first queue indicating the in-use status, and hence the deletion-related degenerate VWAN-ID=2 is stored in this queue while the queue number=0 is set in the tail end number.

Thus, the associative relation between the degenerate VWAN-ID and the VWAN-ID is managed, and the degenerate VWAN-ID is registered according to the necessity in the degenerate VWAN conversion table used by the degenerate VWAN converting unit 12 and by the degenerate VWAN restoring unit 13.

<Degenerate VWAN Restoration>

Next, a degenerate VWAN restoring process will be described. The L2SW 50 has a software reset function. When the software resetting of the L2SW 50 is executed, the controlling/monitoring unit 10A, the database 15 and the management queue 16 are reset. In this case, the database 15 and the management queue 16 return to their initial statuses.

On the other hand, the software resetting does not involve resetting the contents stored in the degenerate VWAN conversion table (hardware) within the L2SW engine 8A. Given next is an explanation of a process of restoring the statuses of the database 15 and the management queue 16 that are associated with the storage contents of the degenerate VWAN conversion table by employing the storage contents of this conversion table.

FIG. 13 is a sequence diagram showing an example of the degenerate VWAN restoring process. FIG. 14 is a flowchart showing an example of the null degenerate VWAN management queue restoring process.

In FIG. 13, when executing the resetting (an input of a reset signal) of the controlling/monitoring unit 10A, an initial startup process for conducting the restoring process is started up within the controlling/monitoring unit 10A.

Then, the controlling/monitoring unit 10A reads all sets (pairs) of the degenerate VWAN-IDs and the VWAN-IDs that are set in the degenerate VWAN conversion table (FIG. 13 <1>: reading hardware setting).

Next, the controlling/monitoring unit 10A registers all the readout sets of the degenerate VWAN-IDs and the VWAN-IDs in the database 15 (FIG. 13 <2>: storing in the database). At this time, an available scheme is that the sets of the degenerate VWAN-IDs and the VWAN-IDs are registered in the database 15 in a way that takes account of the sequence of their being set in the degenerate VWAN conversion table.

Subsequently, the controlling/monitoring unit 10A executes the restoring process of the management queue 16 by employing all the readout sets of the degenerate VWAN-IDs and the VWAN-IDs (FIG. 13 <3>: restoring management queue).

Namely, as shown in FIG. 14, the controlling/monitoring unit 10A performs initialization by changing the respective queues in the table of the management queue 16 into a null (step S21).

To be specific, the controlling/monitoring unit 10A sets a value of "0" as a value of the head number of the management queue, sets a value of "63" as a value of the tail end number of the management queue, and sets a value of "64" as the number of the registered degenerate VWAN-ID. Moreover, the controlling/monitoring unit 10A writes the information "0xffffffff" in all of the queues.

Next, the controlling/monitoring unit 10A repeatedly executes the degenerate VWAN releasing process (step S22) shown in FIG. 11 while the unused degenerate VWAN-IDs continue to exist (loop 1).

At this time, the process in step S14 executed in step S22 involves sequentially storing the degenerate VWAN-IDs in the numerical sequence from the lowest to the highest (1→64) in a way that excludes the degenerate VWAN-IDs read from the degenerate VWAN conversion table as the deleted degenerate VWAN-IDs.

For example, in the first process in step S22 since the process shown in FIG. 14 has been started, if the "degenerate VWAN-ID=1" is not yet used, the "degenerate VWAN-ID=1" is stored in the "queue number=0". Thus, the degenerate VWAN releasing process is executed, wherein each unused degenerate VWAN-ID is set as the delete target degenerate VWAN-ID.

Finally, the management queue 16 in the status where the degenerate VWAN-ID set in the degenerate VWAN conversion table is set in the in-use status, is thereby generated, i.e., the management queue 16 is thereby decompressed (re-stored).

The application of the configuration and the decompression processing flow described above enables the degenerate VWAN-ID to be managed and decompressed within the apparatus, and enables the degenerate VWAN-ID to be efficiently used.

Effect of the Embodiment

As discussed above, according to the embodiment of the present invention, the VWAN-ID called the [degenerate VWAN-ID] used only within the apparatus is separately defined in the interior of the apparatus, and the management (the generation of the MAC learning table 14) of the interior of the apparatus is actualized. The memory for the MAC learning table 14 can be thereby downsized. Along with this downsizing, it is possible to contribute to decrease the power consumption and the cost of the apparatus.

Moreover, in the embodiment of the present invention, the memory 11A is provided with the [degenerate VWAN database 15] and the [null degenerate VWAN management queue 16], and the management algorithm of the degenerate VWAN-ID is implemented in the software (the controlling/monitoring unit 10A is realized software), thereby enabling the improvement of the apparatus performance to be actualized as the retrieving process is simplified and also enabling the contribution to development of the apparatus including the high-quality switching function.

<Others>

The disclosures of international application PCT/JP2005/006353 filed on Mar. 31, 2005 including the specification, drawings and abstract are incorporated herein by reference.

What is claimed is:

1. A frame forwarding apparatus comprising:
a receiving unit receiving a frame including a source address, a destination address and a VWAN (Virtual Wide Area Network) identifier;
a converting unit converting a VWAN identifier in the frame into one of degenerate VWAN identifiers that the number of adoptable values thereof is smaller than the number of VWAN identifiers;
a storage unit containing at least one entry containing the source address in the frame, a degenerate VWAN identifier that a VWAN identifier in the frame is converted, and path information representing a path via which the frame is received;
a retrieving unit retrieving, from said storage unit, an entry corresponding to the destination address in the frame and the degenerate VWAN identifier in the frame;
a restoring unit restoring the degenerate VWAN identifier in the frame into the original VWAN identifier; and
a transmitting unit transmitting the frame based on the path information in the entry retrieved.

2. A frame forwarding apparatus according to claim 1, further comprising:
a degenerate VWAN identifier storage unit containing a plurality of degenerate VWAN identifiers;
a determining unit determining, in response to a VWAN identifier registration request, one of unused degenerate VWAN identifiers stored in said degenerate VWAN identifier storage unit as a degenerate VWAN identifier corresponding to the VWAN identifier related to the registration request; and
a setting unit setting the determined degenerate VWAN identifier as a degenerate VWAN identifier used for the conversion by said converting unit.

3. A frame forwarding apparatus according to claim 2, further comprising:
a using status storage unit stored with a using status of each of the degenerate VWAN identifiers; and
a using status management unit storing a pair of the determined degenerate VWAN identifier and the VWAN identifier corresponding to the determined degenerate VWAN identifier in said using status storage unit.

4. A frame forwarding apparatus according to claim 2, further comprising a deleting unit deleting, in response to a deleting request of a VWAN identifier, an entry containing a degenerate VWAN identifier corresponding to the VWAN identifier relating to the deleting request from said storage unit,
wherein said setting unit cancels the setting of the degenerate VWAN identifier to said converting unit.

5. A frame forwarding apparatus according to claim 4, further comprising a degenerate VWAN identifier management unit storing, when said determining unit determines the degenerate VWAN identifier, information representing an in-use status of the determined degenerate VWAN identifier in said degenerate VWAN identifier storage unit, and storing, when said setting unit cancels the setting of the degenerate VWAN identifier in said converting unit, information representing an unused status of the degenerate VWAN identifier relating to the cancellation of the setting in said degenerate VWAN identifier storage unit.

6. A frame forwarding apparatus according to claim 5, wherein said degenerate VWAN identifier management unit stores, when resetting the information representing an in-use status or an unused status of each degenerate VWAN identifier in said degenerate VWAN identifier storage unit, information representing the in-use status or the unused status of each degenerate VWAN identifier in said degenerate VWAN identifier storage unit based on the setting of the degenerate VWAN identifier to said converting unit.

7. A frame forwarding apparatus according to claim 5, wherein said degenerate VWAN identifier storage unit contains a queue table organized by queues each containing the degenerate VWAN identifier and a queue number indicating a head position of the queue table, and
said degenerate VWAN identifier management unit extracts, in response to the registration request, the degenerate VWAN identifier stored in a queue having the queue number indicating the head position from the queue table as the degenerate VWAN identifier determined by said determining unit, stores the information indicating the in-use status in the queue from which the degenerate VWAN identifier is extracted, and adds a value of "1" to the queue number indicating the head position.

8. A frame forwarding apparatus according to claim 7, wherein said degenerate VWAN identifier storage unit further contains the number of degenerate VWAN identifiers each having the in-use status, and
said degenerate VWAN identifier management unit determines, before executing the process of extracting the degenerate VWAN identifier in response to the registration request, whether the number of the degenerate VWAN identifiers each having the in-use status is equal to or larger than a total number of the degenerate VWAN identifiers, then executes an error process if equal to or larger than the total number thereof, and executes the process of extracting the degenerate VWAN identifier whereas if not.

9. A frame forwarding apparatus according to claim 8, wherein said degenerate VWAN identifier storage unit further contains a queue number indicating a tail end position of the queue table, and
said degenerate VWAN identifier management unit adds, when said setting unit cancels the setting of the degenerate VWAN identifier to said converting unit, a value of "1" to the queue number indicating the tail end position in said degenerate VWAN identifier storage unit, and stores the degenerate VWAN identifier relating to the cancellation of the setting in the queue having the queue number indicating the tail end position thereof.

10. A frame forwarding apparatus according to claim 9, wherein said degenerate VWAN identifier determines, before storing the degenerate VWAN identifier relating to the cancellation of the setting, whether the number of the degenerate VWAN identifiers each having the in-use states is equal to or smaller than 0, then executes an error process if equal to or smaller than 0, and executes a process of storing the degenerate VWAN identifier related to the cancellation of the setting whereas if not.

11. A frame forwarding apparatus according to claim 4, wherein said using status management unit deletes, when canceling the setting of the degenerate VWAN identifier to said converting unit, the pair of the degenerate VWAN identifier and the VWAN identifier from said using status storage unit.

12. A control apparatus of a frame forwarding apparatus including: a receiving unit receiving a frame including a source address, a destination address and a VWAN (Virtual Wide Area Network) identifier; a converting unit converting a VWAN identifier in the frame into one of degenerate VWAN identifiers that the number of adoptable values thereof is smaller than the number of VWAN identifiers; a storage unit containing at least one entry containing the source address in the frame, a degenerate VWAN identifier that a VWAN identifier in the frame is converted, and path information representing a path via which the frame is received; a retrieving unit retrieving, from said storage unit, an entry corresponding to the destination address in the frame and the degenerate VWAN identifier in the frame; a restoring unit restoring the degenerate VWAN identifier in the frame into the original VWAN identifier; and a transmitting unit transmitting the frame based on the path information in the entry retrieved, said control apparatus comprising:

a degenerate VWAN identifier storage unit containing a plurality of degenerate VWAN identifiers;

a determining unit determining, in response to a VWAN identifier registration request, one of unused degenerate VWAN identifiers stored in said degenerate VWAN identifier storage unit as a degenerate VWAN identifier corresponding to the VWAN identifier related to the registration request; and a setting unit setting the determined degenerate VWAN identifier as a degenerate VWAN identifier used for the conversion by said converting unit.

\* \* \* \* \*

UNITED STATES PATENT AND TRADEMARK OFFICE
CERTIFICATE OF CORRECTION

| | | |
|---|---|---|
| PATENT NO. | : 7,724,736 B2 | Page 1 of 1 |
| APPLICATION NO. | : 11/905357 | |
| DATED | : May 25, 2010 | |
| INVENTOR(S) | : Yoshiyuki Maeda et al. | |

It is certified that error appears in the above-identified patent and that said Letters Patent is hereby corrected as shown below:

On the Title Page
In Item (75), Line 6, change "Yoshi" to --Yoshii--.

Signed and Sealed this

Twenty-third Day of November, 2010

David J. Kappos
*Director of the United States Patent and Trademark Office*